US012615252B1

(12) United States Patent
Zhang et al.

(10) Patent No.: US 12,615,252 B1
(45) Date of Patent: Apr. 28, 2026

(54) DEVICES, SYSTEMS, AND METHODS FOR UNIFORMLY IMPLEMENTING A NO KNOWN PASSWORD SECURITY SOLUTION FOR AUTHENTICATION

(71) Applicant: Morgan Stanley Services Group Inc., New York, NY (US)

(72) Inventors: Taiyi Zhang, Shanghai (CN); Yan Zhao, Shanghai (CN); Jun Wu, Shanghai (CN); Wei Jiang, Shanghai (CN); Keith H. Young, London (GB)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 19/278,429

(22) Filed: Jul. 23, 2025

(51) Int. Cl.
*H04L 9/40* (2022.01)

(52) U.S. Cl.
CPC ...... *H04L 63/0846* (2013.01); *H04L 63/0807* (2013.01); *H04L 63/102* (2013.01)

(58) Field of Classification Search
CPC ............. H04L 63/0846; H04L 63/0807; H04L 63/102
See application file for complete search history.

(56) References Cited

U.S. PATENT DOCUMENTS

| | | | |
|---|---|---|---|
| 9,774,616 B2 | 9/2017 | Flores et al. | |
| 11,107,080 B2 | 8/2021 | Malik et al. | |
| 11,665,161 B2 | 5/2023 | Alexander et al. | |
| 11,907,349 B2 | 2/2024 | Rennich et al. | |
| 2011/0072265 A1 | 3/2011 | Hammond, II et al. | |
| 2017/0055150 A1 | 2/2017 | Hou et al. | |
| 2022/0004617 A1 | 1/2022 | Irwin, III | |
| 2022/0200800 A1* | 6/2022 | Xu | H04L 9/088 |
| 2024/0134954 A1 | 4/2024 | Barboi | |
| 2025/0023859 A1 | 1/2025 | Seidenstein et al. | |
| 2025/0219821 A1* | 7/2025 | Prasad | H04L 9/30 |
| 2025/0274462 A1* | 8/2025 | Atur | H04L 63/1425 |

* cited by examiner

*Primary Examiner* — Nelson S. Giddins
(74) *Attorney, Agent, or Firm* — K&L Gates LLP

(57) ABSTRACT

A method of implementing a universal no known password (NKP) security solution for authentication is disclosed herein. The method can include receiving an application programming interface (API) call comprising a request for a new NKP account from a computing device of an owner of an application, in response to the request for the new NKP account, generating an account on a directory service associated with the application, generating an authentication credential associated with the account, and pushing the authentication credential to a host or container of a plurality of hosts and containers that corresponds to the authentication credential.

19 Claims, 6 Drawing Sheets

200

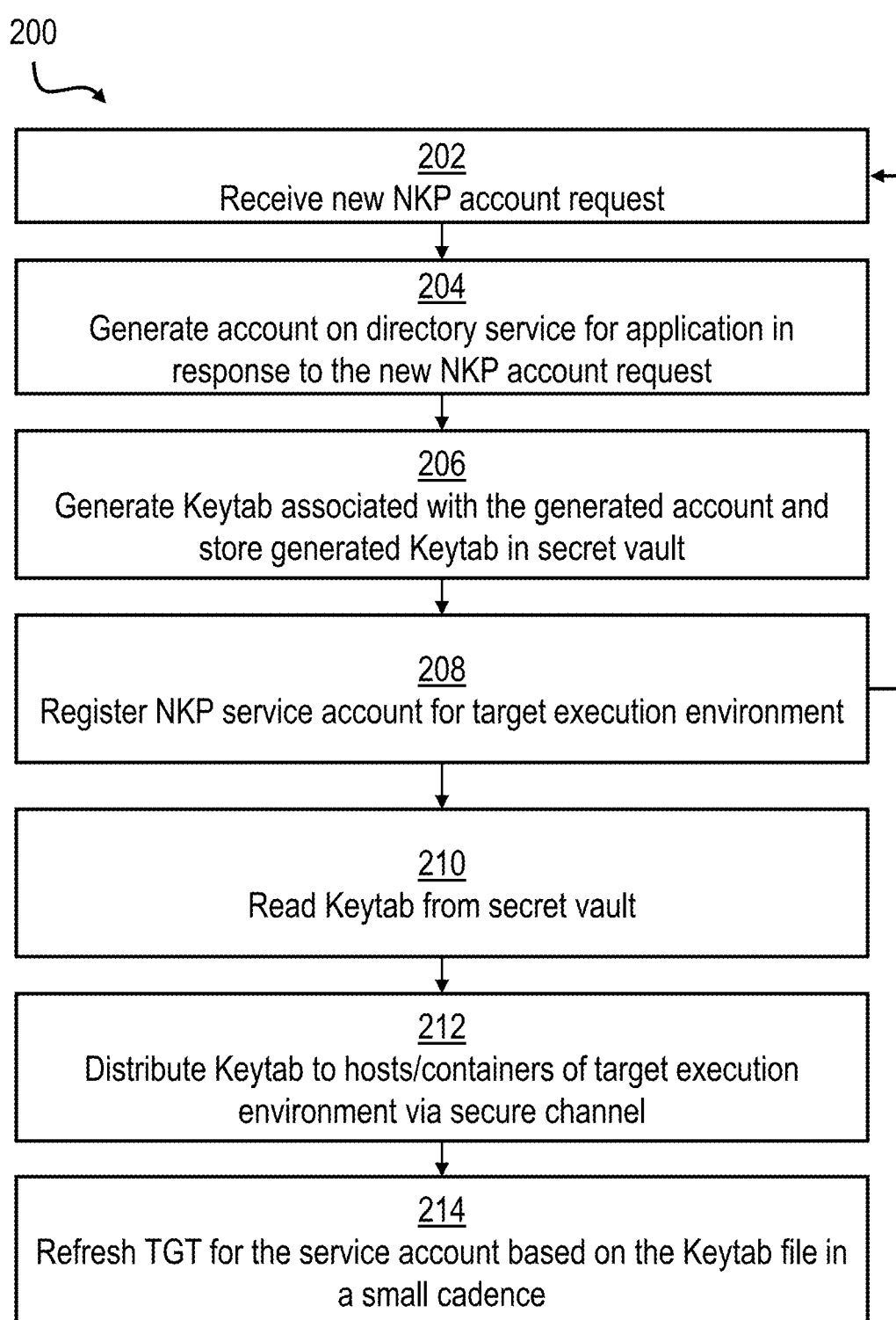

202
Receive new NKP account request

204
Generate account on directory service for application in response to the new NKP account request 206
Generate Keytab associated with the generated account and store generated Keytab in secret vault 208
Register NKP service account for target execution environment 210
Read Keytab from secret vault 212
Distribute Keytab to hosts/containers of target execution environment via secure channel 214
Refresh TGT for the service account based on the Keytab file in a small cadence

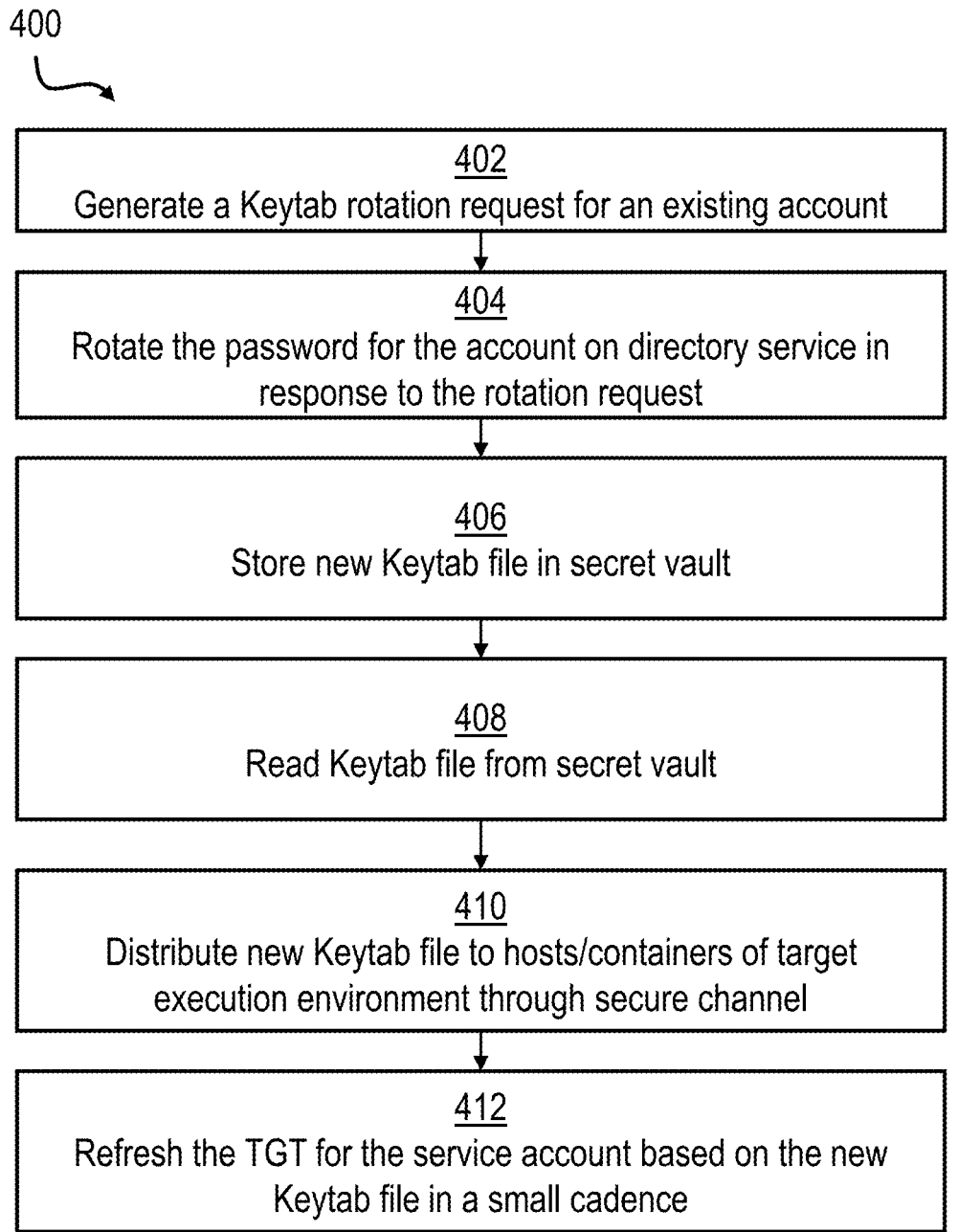

402
Generate a Keytab rotation request for an existing account

↓

404
Rotate the password for the account on directory service in response to the rotation request

↓

406
Store new Keytab file in secret vault

↓

408
Read Keytab file from secret vault

↓

410
Distribute new Keytab file to hosts/containers of target execution environment through secure channel

↓

412
Refresh the TGT for the service account based on the new Keytab file in a small cadence

DEVICES, SYSTEMS, AND METHODS FOR UNIFORMLY IMPLEMENTING A NO KNOWN PASSWORD SECURITY SOLUTION FOR AUTHENTICATION

BACKGROUND

Various means of authenticating a user and/or service in an enterprise computer network have been developed to ensure secure access without requiring the transmission of a password. Kerberos, for example, uses a third-party system (known as a Key Distribution Center or "KDC") to issue time-sensitive tickets for user authentication. When a user logs in, the system requests a Ticket Granting Ticket (TGT) from the KDC on the user's behalf, which issues time-sensitive tickets in response to such requests. Although these systems protect against eavesdropping and replay attacks, they still often require the user to verify their identity by providing an encrypted password before the TGT is issued. Once issued, the TGT can be used to request service tickets to access specific network resources without having to re-enter their credentials. Such ticket-based systems may protect against eavesdropping and replay attacks, which makes them preferable for large, security-conscious environments such as corporate networks or government systems.

As a result, even when passwords are not transmitted across the network, users must still manage and maintain them. Risks associated with the use of a known password for a service account and/or container identifier remain relatively high because—even when they are not transmitted—the use of known passwords can potentially lead to intentional or unintentional password leaks. While some "No Known Password" (NKP) authentication mechanisms have been developed—such as group Managed Service Accounts (gMSAs)—these are generally restricted to specific operating systems, such as Microsoft Windows. However, most enterprise IT environments are heterogeneous and include a wide range of systems, such as Linux or Unix-based servers, storage devices, and databases. These non-Microsoft systems typically lack built-in support for NKP solutions like gMSAs.

Furthermore, existing NKP solutions are not standardized and cannot be uniformly deployed across platforms. This creates operational inefficiencies and increases the likelihood of configuration errors. Different IT assets, for example, may be controlled by different owners and thus, may utilize different, bespoke authentication processes for different purposes. These differences result in different maintenance schedules, different security measures, and increased security risks. In other words, known NKP solutions leave many IT infrastructures exposed.

SUMMARY

In one general aspect, the present invention provides computer-implemented systems and methods for implementing a universal "no known password" (NKP) security solution for authentication within an enterprise networked computing environment. In various embodiments, the method includes executing, by one or more computing devices, an identity management software system, a credential vault software system, and a credential distribution software system that cooperate to provision, store, and distribute authentication credentials. In operation, the identity management software system receives an API call from an application owner's computing device requesting creation of a new NKP account, generates a corresponding service account on a directory service, and produces an associated authentication credential. The credential vault software system stores the credential in response to a write command. The credential distribution software system retrieves the credential via a read command and securely pushes it to a corresponding target execution environment, such as a host or container, for use in authentication.

In various embodiments, the method may further include refreshing a ticket-granting ticket (TGT) via an NKP agent deployed at the target execution environment, joining a domain using the credential, rotating the credential based on a triggered event or predefined cadence, and updating mapping relationships that associate credentials with specific target hosts or containers. These enhancements provide flexible control over lifecycle operations, access boundaries, and security posture.

The inventive NKP solution provides numerous technical advantages over traditional authentication systems. By enabling credentials to be generated centrally and pushed securely to diverse computing environments—including non-Microsoft systems that lack native credential retrieval functionality—the system standardizes authentication across heterogeneous infrastructure. It eliminates the need for human-managed passwords, reduces the risk of credential leakage, and supports automated rotation and lifecycle enforcement without manual intervention. These improvements enhance security, reduce administrative overhead, prevent configuration errors, and enable a scalable, auditable, and platform-agnostic authentication framework. These and other benefits that can be realized through embodiments of the present invention will be apparent from the description that follows.

FIGURES

Various aspects of the present invention are described herein by way of example in connection with the following figures.

FIG. 2 is an algorithmic flow diagram of a method of onboarding an NKP solution according to one embodiment of the present disclosure.

FIG. 4 is an algorithmic flow diagram of a method of rotating a credential for NKP authentication using the system of FIG. 1, as configured in FIG. 3, according to one embodiment of the present disclosure.

DESCRIPTION

Figure 1:
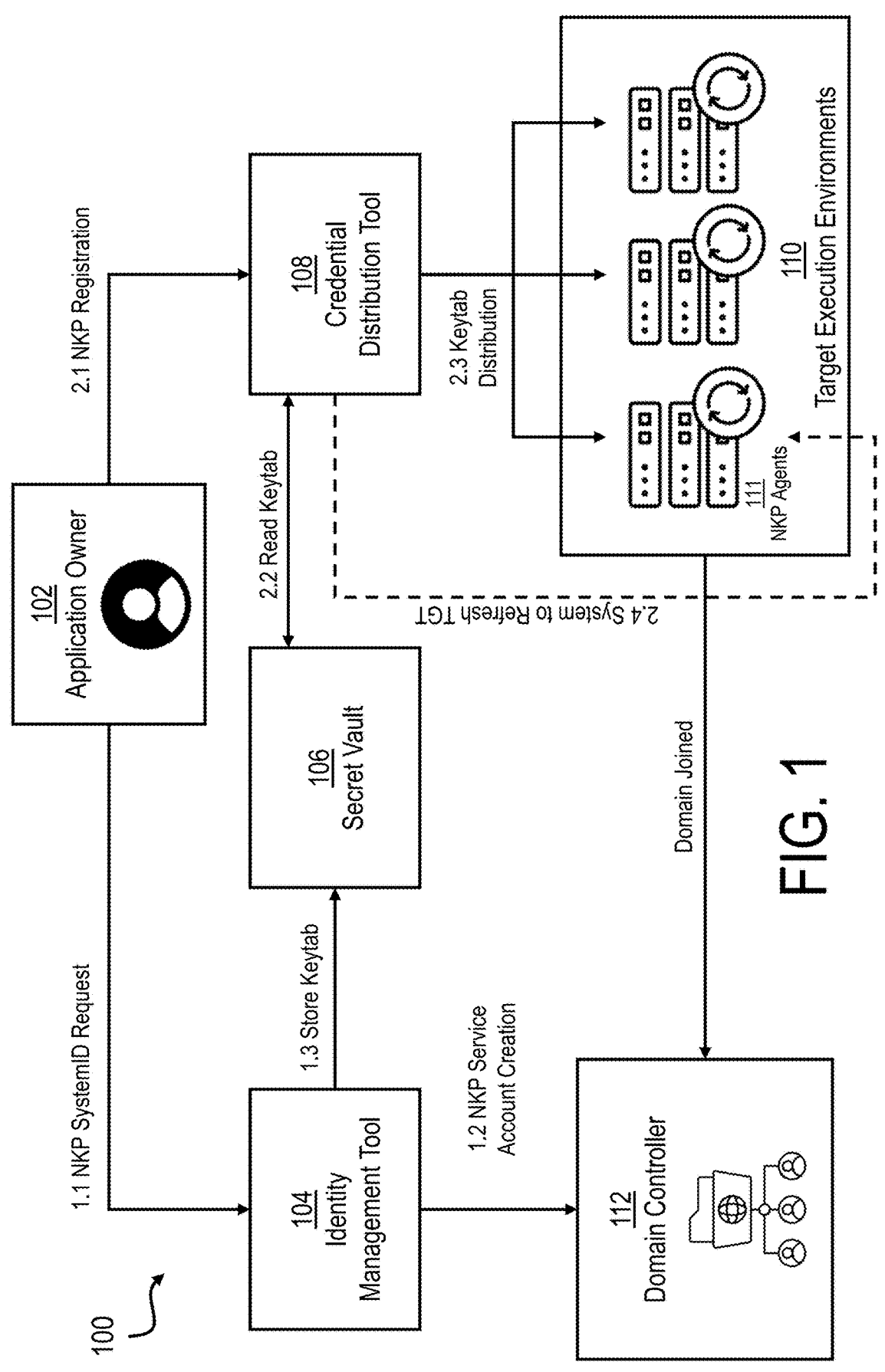
FIG. 1 is a block diagram of a system configured to uniformly implement an NKP security solution for authentication according to one embodiment of the present disclosure.

Referring now to FIG. 1, a block diagram of a system 100 configured to uniformly implement an NKP security solution for authentication in an enterprise computing environment according to one embodiment of the present invention. The system 100 is designed to operate within an enterprise's IT infrastructure and includes various interconnected components for managing authentication credentials across multiple hosts and platforms. As used herein, the term "enterprise" refers to any organized entity that operates or manages a computing environment comprising multiple systems, devices, or applications, such as a corporation, a government agency, a non-profit institution, an educational organization, or other entities with an information technology (IT) infrastructure that supports users, services, and administrative operations. The enterprise may span on-premises, cloud-based, or hybrid environments, and may employ identity and access management tools, domain controllers, and security protocols to govern system access and credential management. For example the tools described herein can include software systems, which may be executed on one ore more computers to perform the methods and functionality described herein.

In the illustrated example, the system 100 can include a user computing device 102 of an application owner that is communicatively coupled to an identity management tool 104 configured to generate authentication credentials and a credential distribution tool 108 configured to distribute authentication credentials. Both the identity management tool 104 and the credential distribution tool 108 can be communicatively coupled to a secret vault 106 configured to store authentication credentials generated by the identity management tool 104. The credential distribution tool 108 can be communicatively coupled to a plurality target execution environments 110, each of which can be configured to store and execute an NKP Agent. A target execution environment can be a computing context in which application code, services, or agents execute, and which is capable of receiving and utilizing authentication credentials. A target execution environment may include, without limitation, a physical host (e.g., a server), a virtual machine (VM), a container (e.g., a Docker or Kubernetes container), or any other compute instance capable of executing software within an enterprise computing environment. A target execution environment is typically operated within a networked infrastructure and may be configured to execute authentication agents (e.g., NKP agents), service applications, or credential consumers. In various embodiments, a target execution environment is configured to receive authentication credentials from a credential distribution software system via a secure communication protocol (e.g., SCP, SSH, TLS), and to inject or apply those credentials to an executing process or application runtime without persisting the credentials to disk. For example, the credential may be used to refresh a ticket-granting ticket (TGT) from a domain controller or to authenticate to an enterprise service. Target execution environments may be instantiated dynamically, such as in container orchestration platforms (e.g., Kubernetes), or may exist persistently, such as long-lived application servers. They may also include environments running on non-Microsoft operating systems (e.g., Linux or Unix) or Windows-based systems.

A domain controller 112 can be communicatively coupled to the plurality of target execution environments 110 (sometimes referred to as host/containers 110 below) and the identity management tool 104. All components of the system 100 can communicate over a data network (e.g., WiFi, cellular, satellite, LAN, etc.), as facilitated by one or more application program interfaces (APIs). For example, the representational state transfer (REST) API can be implemented to enable the system's components to communicate over the web using standard HTTP methods (e.g., GET, POST, PUT, DELETE, etc.). Such an API can follow stateless or uniform interface principles, such that the applications used by the system 100 can send requests and receive responses to those requests from other system 100 components.

According to FIG. 1, the user computing device 102 of the application owner can include any computing device (e.g., server, personal computer, laptop, tablet, smartphone, virtual machine, etc.) configured to function as an endpoint that is controlled by the owner of a particular application for which the NKP security solution is being deployed. An "application owner" in this context can refer to an individual or team within the enterprise responsible for deploying, managing, or maintaining an application and initiating authentication workflows on its behalf. In that connection, the user computing device 102 of the application owner can be a trusted device from which the application owner can interact with the system 100. It can be configured to initiate authentication and authorization workflows for accessing applications, services, and/or data. The user computing device 102 of the application owner can participate in passwordless authentication because it can be configured to rely on secure identity methods, such as certificates, biometrics, hardware tokens (e.g., TPM, YubiKey, etc.) or federated identity services (e.g., SSO with SAML or OAuth) rather than passwords. The user computing device 102 of the application owner can run secure agents of software development kits that interface with "secret managers," such as the identity management tool 104 and the secret vault 106, that handle credentials securely without ever exposing them to the user. The user computing device 102 of the application owner can further maintain trust posture because its operating system version, security settings, and/or antivirus status is verified continuously or at login times as part of a conditional access policy. Additionally, the user computing device 102 of the application owner can be configured to log and monitor system 100 usage to ensure compliance, detect anomalies, and support audits, which can be essential in a zero trust environment, such as the environment supported by the system 100. However, most notably, the user computing device 102 of the application owner can be configured to generate various requests, such as a new NKP service request, credential rotation requests, mapping relationship update requests, etc., and transmit such requests to various components of the system 100, such as via the REST API.

In further reference to FIG. 1, the identity management tool 104 can be configured to receive requests from the user computing device 102 of the application owner via the REST API and process such requests. Specifically, the identity management tool 104 can be configured to manage the account lifecycle and support both user and service integration with various systems (e.g., Lightweight Directory Access Protocol, Active Directory, etc.). The identity management tool 104 can include a computing device or system configured to verify the identity of users, applications, and devices as part of a foundational, zero trust, and passwordless architecture. For example, in response to a request received from the user computing device 102 of the application owner, the identity management tool 104 can take a required action, such as generating a service account on a directory service (e.g., Lightweight Directory Access Protocol, Active Directory, etc.) for the application, generating authentication credentials, storing authentication credentials in the secret vault 106, and/or rotating authentication credentials. Authentication credentials, for example, can include keytabs, or secret credentials for the service account. According to various embodiments, the identity management tool 104 can be configured to update authentication credentials regularly according to a programmed cadence to avoid credential leakage and enhance security. In other words, the identity management tool 104 is a trusted component of the system 100 and, thus, other components (e.g., the secret vault 106) trust its validation of identities and allow access to secrets, subject to certain policies. The identity management tool 104 may enforce policies that govern conditional access, applying rules such as "only allow access if the device is compliant," or "only from specific IP ranges or during work hours," or "rotate credentials every X minutes." The identity management tool 104 may further be configured to log and audit activity across the system 100 such that every interaction can be tracked for compliance and security. This can include logging whenever the user computing device 102 of the application owner issues a request, when authentication credentials are generated and stored, and what accesses are granted by the system 100.

For example, according to various embodiments, the identity management tool 104 can be configured to authenticate the application owner upon receipt of a request, verifying who or what is making the request. Such authorization can include use of certificate-based authentication process, OAuth2 tokens, SAML assertions, or biometric authentication, but never via a known password. Upon authentication, the identity management tool 104 can be configured to create/register a service account on the directory service based on the request and generate and issue authentication credentials associated with the service account based on the request and store such credentials in the secret vault 106. According to another embodiment, the identity management tool 104 can be configured to rotate authentication credentials for one or more of the plurality of host/containers 110 associated with an already registered service account. In other words, the identity management tool 104 functions as the gatekeeper of trust for the system 100, proving identities and allowing other components, like the secret vault 106, safely act on such proofs without ever having to handle or store known passwords.

Still referring to FIG. 1, the secret vault 106 can be configured to store and manage secrets. For example, the secret vault 106 can be configured to process "READ" and "WRITE" calls for secrets in response to requests from the identity management tool 104 and the credential distribution tool 108. As previously discussed, the secret vault 106 can store authentication credentials (e.g., keytabs, API keys, TLS certificates, OAuth tokens, encryption keys, etc.) generated by the identity management tool 104 in response to a WRITE call received via the REST API. However, the secret vault 106 can also retrieve authentication credentials (e.g., keytabs, API keys, TLS certificates, OAuth tokens, encryption keys, etc.) requested by the credential distribution tool 108 in response to a READ call received via the REST API for distribution to the plurality of host/containers 110. Unlike pull models, the push model employed by the system 100 can cause authentication credentials stored in the secret vault 106 to be proactively retrieved, via a READ call, by the credential distribution tool 108 and distributed to the NKP aged 111 of one or more of the plurality of host/containers 110 via a secure channel (secure file copy (SCP), shell protocol (SSH), etc.).

The credential distribution tool 108 of the system 100 of FIG. 1 can be configured to receive requests from the user computing device 102 of the application owner via the REST API and process such requests. For example, the credential distribution tool 108 can receive a request to register the service account generated by the identity management tool 104 on one or more of the NKP agents 111 of the plurality of host/containers 110. Upon receiving a request or signal from the NKP agent 111 indicating readiness to receive a credential, the credential distribution tool 108 can retrieve the appropriate credential from the secret vault 106, for example, via a READ call provided by the REST API. Once retrieved, the credential distribution tool 108 can proactively distribute or "push" the authentication credential to the appropriate NKP agent 111 of the plurality of host/containers 110 via a secure channel (SCP, etc.). In response, the NKP agent 111 can refresh the TGT for the service account based on the pushed authentication credential in accordance with a programmed cadence (e.g., three hours).

In other words, the credential distribution tool 108 is an essential component of the system 100 of FIG. 1 because it can proactively distribute the authentication credential to target hosts/containers 110 and can also maintain a mapping relationship between service account and target hosts/containers 110. Moreover, the hosts/containers 110 can associate with other kinds of asset-level attributes like application identifiers, etc., to achieve rule-based accurate distribution of authentication credentials. According to some embodiments of the present invention, the credential distribution tool 108 can provide a standard REST API call for metadata queries.

FIG. 1 also depicts the plurality of host/containers 110 configured to store and execute an NKP agent 111. The plurality of host/containers 110, for example, can include a virtual machines, EC2 instances, and/or physical servers that function as the runtime environment where an application executes. However, each of the plurality of host/containers 110 require an authentication credential to access the application-even though such secrets are never hardcoded or stored insecurely by any of the plurality of host/containers 110. The NKP agents 111 can be lightweight applications configured to securely receive authentication credentials or secrets stored in the secret vault 106 from the credential distribution tool 108, authenticate the environment to the identity provider or vault, and inject the received authentication credentials into the app runtime without ever storing them. In other words, the NKP agent 111 can be a small program or service running inside the host or container that handles all secret and identity tasks automatically, including monitoring the credential distribution tool 108 for activity such that pushed authentication credentials are received "just-in-time." Once received, the NKP agents 111 can inject the authentication credentials into the application making them available via environment variables, memory-mapped files, volume mounts, and/or process arguments without ever storing them unencrypted onto any disk. The NKP agents 111 can be further configured to eliminate any trace of pushed authentication credentials from the credential distribution tool 108 after they are no longer needed by the plurality of host/containers 110. This can be accomplished, for example, via a short time-to-live (TLL) or destroy after use protocol. The NKP agents 111 can also rotate authentication credentials, as they can be configured to monitor for credential expiration or revocation signals from the credential distribution tool 108.

If the plurality of host/containers 110 include any non-Microsoft products (e.g., Linux, Unix, etc.), it is likely that Kerberos tools (e.g., kinit, ktutil, etc.) may be specifically designed for the manual management of authentical credentials (e.g., keytabs). Such machines do not inherently have permissions to create/update accounts or authentication credentials from Active Directory. Thus, the default model for such hosts/containers 110 is for authentication credentials to be "pushed" to them from an external source. The system 100, however, handles the creation of authentication credentials via the identity management tool 104. The credential distribution tool 108 can retrieve the appropriate credential from the secret vault 106 upon receiving a request from the NKP agent 111 executed by each of the plurality of host/containers 110, regardless of whether or not the host/container 110 runs a Microsoft or non-Microsoft operating system. The NKP agent 111, therefore, caters to non-Microsoft hosts/containers 110, which ensures that access of each of the plurality of host/containers 110 is accounted for and managed by the system 100. In other words, by employing a "push" based credential protocol, the system 100 of FIG. 1 provides a universal, unified means of implementing NKP security for products like Kerberos. Additionally, the NKP agents 111 are deployed on target hosts/containers automatically for the initial machine build, refresh, and removal of authentication credentials. Thus, although the default for non-Microsoft products is specifically designed for the manual management of authentical credentials, the system 100 of FIG. 1 automates such processes providing lower maintenance security and efficiency for diverse IT infrastructures.

The domain controller 112 of the system 100 of FIG. 1 can include a server configured to host the application, run Active Directory Domain Services (AD DS) to authenticate users and machines, issue TGTs, enforce access policies. In response to a request from the identity management tool 104, the domain controller 112 can be configured to generate and issue a TGT that identifies and authenticates the identity management tool 104 for the secret vault 106. Such tickets can be used to authenticate the identity management tool 104 and computing device 102 of the application owner, establishing trust on behalf of the rest of the system 100. Upon receiving the authentication credential from the credential distribution tool 108, the NKP agents 111 of each of the plurality of host/containers 110 can join a domain hosted by the domain controller 112, because the authentication credentials generated by the identity management tool 104, stored in the secret vault 106, and retrieved by the credential distribution tool 108 have already been authenticated by the TGTs issued by the domain controller 112. Notably, the NKP agents 111 of each of the plurality of host/containers 110 can only belong to the domain for the duration of a lifecycle authorized by the TGT and authentication credential. The NKP agents 111 of each of the plurality of host/containers 110 can not permanently join the domain.

It shall be appreciated that the system 100 of FIG. 1 can provide a more secure solution for managing authentication credentials. For example, the system 100 enables the creation of dedicated service accounts to isolate and, therefore, protect access and data. Additionally, the system 100 enables automation for credential distribution. The NKP agents 111, specifically, can be executed as part of a target service for the distribution, reconfiguration, and/or removal of authentication credentials in accordance with a predetermined cadence, which ensures the system 100 will never stagnate and that secure access is constantly being assessed and enforced.

Additionally, the system 100 of FIG. 1 can be configured to generate authentication credentials via a separate identity management tool 104 and "push" the appropriate authentication credentials to the requesting host or container 110, such as a computing device that runs Linux or Unix. This differs from known techniques, in which hosts and containers essentially "pull" or retrieve their own authentication credentials without a third-party administrative entity having to generate and store the credential on their behalf. The difference is notable because many non-Microsoft hosts lack the native tools to securely pull their own authentication credentials, especially when integrating with an Active Directory. In other words, many hosts or containers do not have a "machine password retrieval" function, like Microsoft products. Thus, the system 100 enables a user or administrator to generate their own keytabs, securely copy and/or push those keytabs to the requesting host or container, which then uses the "pushed" authentication credential without needing a human password. In contrast, upon creating accounts, Microsoft products tend to get their keys (e.g., passwords derived for Kerberos) automatically from the domain. Such products then update and rotate their credentials without administrative intervention. By enabling a "push" based architecture, the system 100 is compatible with both Microsoft and non-Microsoft hosts and containers alike. Thus, the system 100 enables a single, unified solution for NKP implementations that not only eliminates the need for human managed passwords but also eliminates the need for separate, bespoke solutions for each host or container. This provides numerous technological benefits including enhanced security with fewer computational resources and streamlined maintenance.

FIG. 1 further illustrates two communication paths throughout the system 100. In a first communication path, the computing device 102 of the application owner initiates an NKP SystemID request and transmit such a request to the identity management tool 104 (1.1), which creates an NKP service account with the domain controller 112 (1.2), and generates and stores an authentication credential in the secret vault (1.3). In a second communication path, the computing device 102 of the application owner initiates an NKP registration request and transmits it to the credential distribution tool 108 (2.1), which reads the requisite authentication credentials from the secret vault 106 (2.2) and distributes them to the hosts and/or containers of the plurality of hosts/containers 110 (2.3) the application owner seeks to register with the service account. Having received the requisite authentication credentials, the NKP agent 111 of the registered hosts and/or containers of the plurality of hosts/containers 110 (2.4) can refresh the TGT with the domain controller 112 and the domain can be joined. It shall be appreciated that, according to various embodiments, interactions between system 100 components can be achieved via REST API calls.

The identity management tool, the secret vault, and the credential distribution tool can be corresponding software systems executed by one or more computing devices within the enterprise computing environment. In that connection, the identity management tool is sometimes referred to herein as an identity management software system, the secret vault is sometimes referred to as a credential vault software system, and the credential distribution tool is sometimes referred to herein as a credential distribution software system. Each of these software systems may include application logic, APIs, and secure communication interfaces necessary to perform their respective credential management functions within the system. The software systems may be deployed in a variety of configurations, including as standalone applications, microservices, containerized workloads (e.g., Docker containers), virtual machines, or managed cloud services. They may reside on dedicated hardware, virtualized infrastructure, or cloud platforms, depending on enterprise requirements and scalability needs. In typical implementations, each software system is executed by a computing device that includes one or more processors, memory, storage, and network interfaces. These computing devices may be physical servers, virtual machines, or cloud instances, and may be connected via enterprise networks that support secure data transmission protocols. The software systems may run on a single computing device or may be distributed across multiple, internetworked computing devices.

Referring now to FIG. 2, an algorithmic flow diagram of a method 200 of onboarding an NKP solution using the system 100 of FIG. 1 is depicted according to one embodiment of the present disclosure. For example, when an application owner wants to initiate the system 100 (FIG. 1) to implement a NKP solution to support system-to-system authentication on Linux/Unix or containers and reduce risk by making the password unknown to human users, the method 200 of FIG. 2 can be employed.

According to the example shown in FIG. 2, the method 200 may first focus on creating an account and generating the requisite authentication credentials. plurality of host/containers 110 (FIG. 1). This can be accomplished via the identity management tool 104 (FIG. 1). For example, the method 200 can include receiving 202 a new NKP account request from a computing device 102 (FIG. 1) of an application owner. This can result when an application owner accesses the identity management tool 104 (FIG. 1) and places the new request for an NKP service account. In response to the new NKP account request, the method 200 can further include generating 204 an account on a directory service for an application and then generating 206 an authentication credential, such as a keytab, associated with the application of the generated account. For example, the service account can be generated on the directory service (e.g., Open LDAP, Active Directory etc.) for the application. The generated authentication credential can be stored in the secret vault 106 (FIG. 1). It shall be appreciated that the authentication credential can be updated regularly in a certain cadence to avoid credential leakage.

Still referring to FIG. 2, the method 200 can subsequently focus on registering the plurality of host/containers 110 (FIG. 1). This can be accomplished via the credential distribution tool 108 (FIG. 1). For example, the method 200 can further include registering 208 the created NKP service account on each of the plurality of host/containers 110 (FIG. 1). For example, the method 200 can include reading 210 the authentication credential from the secret vault 106 (FIG. 1), for example, via a REST API call. The method 200 can further include distributing 212 the authentication credential to targeted hosts/containers of the plurality of host/containers 110 (FIG. 1) through secure channel (SCP etc.). Once distributed, the method 200 can include refreshing 214 the TGT for the service account based on the authentication credential in accordance with a predetermined cadence (e.g., three hours). Such refreshing can be performed by the NKP agent 111 (Figure) run by the targeted hosts/containers of the plurality of host/containers 110 (FIG. 1).

Figure 3:
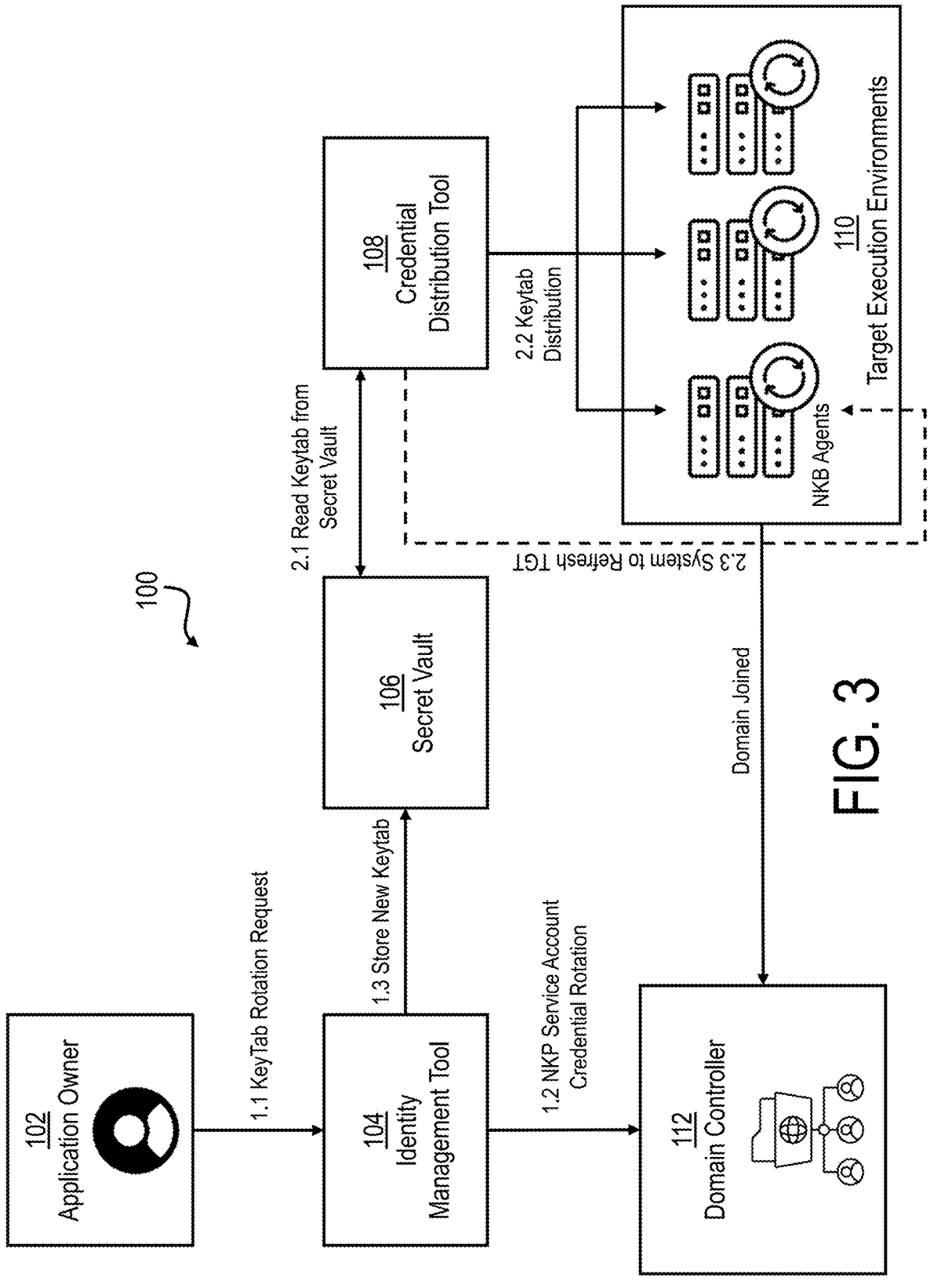
FIG. 3 is a block diagram of the system of FIG. 1 configured to rotate a credential for NKP authentication according to one embodiment of the present disclosure.

Referring now to FIG. 3, a block diagram of the system 100 of FIG. 1 configured to rotate a credential for NKP authentication is depicted according to one embodiment of the present disclosure. According to FIG. 3, the application owner wants to rotate the authentication credentials for an existing service account in order to reduce risks such as credential owner termination, credential stagnation, and/or host/container rebuilds. The system 100 architecture of FIG.

3 remains similar to the architecture of FIG. 1, but illustrates two new communication paths.

For example, according to FIG. 3, a first communication path can exist begin at the computing device 102 of the application owner, which can initiates an credential rotation request and transmit such a request to the identity management tool 104 (1.1). The identity management tool 104 can rotate the password for the service account on a directory service (e.g., Open LDAP, Active Directory etc.) of the domain controller 112 (1.2). Then, the identity management tool 104 can generate and store new authentication credentials in the secret vault (1.3) in response to the request. In a second communication path, the credential distributions tool 108 reads the newly rotated authentication credentials from the secret vault 106 (2.1) and distributes them to the hosts and/or containers of the plurality of hosts/containers 110 (2.2), which causes the NKP agent 111 of the registered hosts and/or containers of the plurality of hosts/containers 110 (2.4) to perform a system refresh of the TGT.

Referring now to FIG. 4, an algorithmic flow diagram of a method 400 of rotating a credential for NKP authentication using the system of FIG. 1, as configured in FIG. 3, depicted according to one embodiment of the present disclosure. A first portion of the method 400 can be directed to a credential rotation process. For example, the method 400 can include generating 402 a credential rotation request for an existing account. The application owner may initiate this request and transmit it to the identity management tool 104 (FIG. 3). The method 400 can further include rotating 404 the appropriate credentials for the account on directory service in response to the rotation request. The identity management tool 104 (FIG. 3), for example, may process the request and rotate the credential via the directory service (e.g., Open LDAP, Active Directory etc.) of the domain controller 112 (FIG. 3). Thus, the method 400 can include storing 406 the new credential in the secret vault 106 (FIG. 3).

The method 400 of FIG. 4 can further include a rotated credential distribution process, wherein the method 400 further includes the credential distribution tool reading 408 the new credential from the secret vault 106 (FIG. 3) and distributing 410 the new credential to all target hosts/containers 110 (FIG. 1) through a secure channel (SCP etc.). Finally, the method 400 can include refreshing 412 the TGT for the service account based on the new credential in a small cadence. For example, the NKP agent 111 (FIG. 3) can refreshes the TGT for the service account based on the new Keytab file in a small cadence (e.g., three hours). The application owner does not have to trigger the method 400. According to various embodiments, the method 400 can be triggered by an employee termination event, a timer event, or other events.

Figure 5:
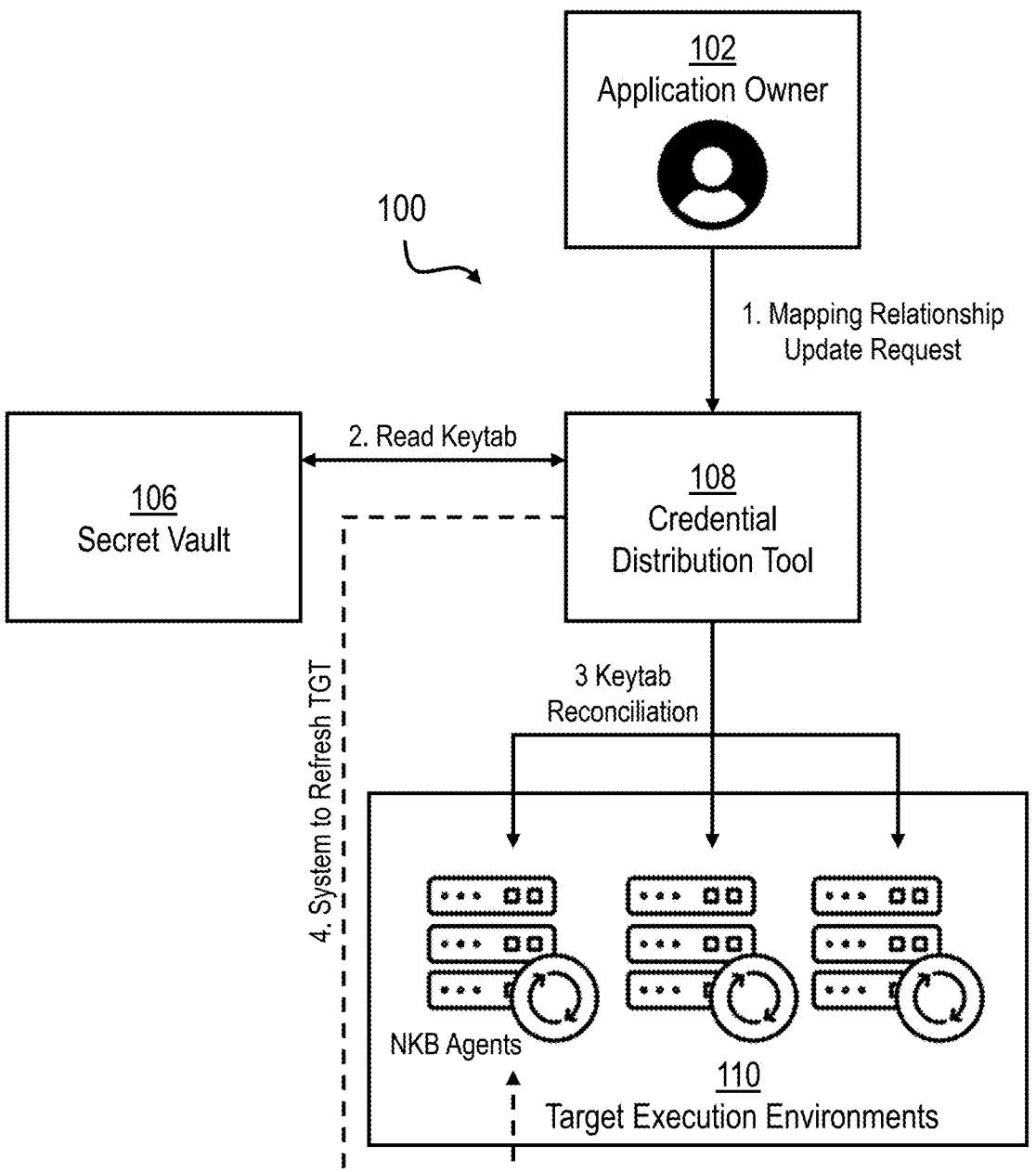
FIG. 5 is a block diagram of the system of FIG. 1 configured to map a relationship update for NKP authentication according to one embodiment of the present disclosure.

Referring now to FIG. 5, a block diagram of the system 100 of FIG. 1 configured to map a relationship update for NKP authentication is depicted according to one embodiment of the present disclosure. In other words, it may be necessary or desired to maintain and/or adjust certain associations of machine identities (e.g., a virtual machine or container) and the principal it is authorized to use. Mapping ensures that when a credential is pushed to a host or container, it corresponds to a trusted, pre-defined identity (e.g., host/container123.myapp.com@REALM). Updating these mappings may involve registering new hosts, rotating service principals, revoking old associations, or enforcing stricter scoping (e.g., ensuring a keytab for app-A can only be used by containers in a certain namespace). This can help preserve the integrity of the authentication process, ensuring that keytabs are used only by the entities they are intended for, minimizing lateral movement risk, and enforcing least privileges.

For example, the configuration of FIG. 5 can be used when an application owner wants to add or remove target hosts/containers for the service account. Thus, the computing device 102 of the application owner may initiate a relationship map update request (1) and transmit the request to the credential distribution tool 108. In response, the credential distribution tool 108 can read the authentication credentials from the secret vault 106 (2) and reconcile them across the registered hosts and/or containers of the plurality of hosts/containers 110 (3). Once again, the NKP agent 111 can refresh the TGT for the service account based on the new Keytab file in a predetermined, relatively short, cadence or regular interval (e.g., three hours) (4).

Figure 6:
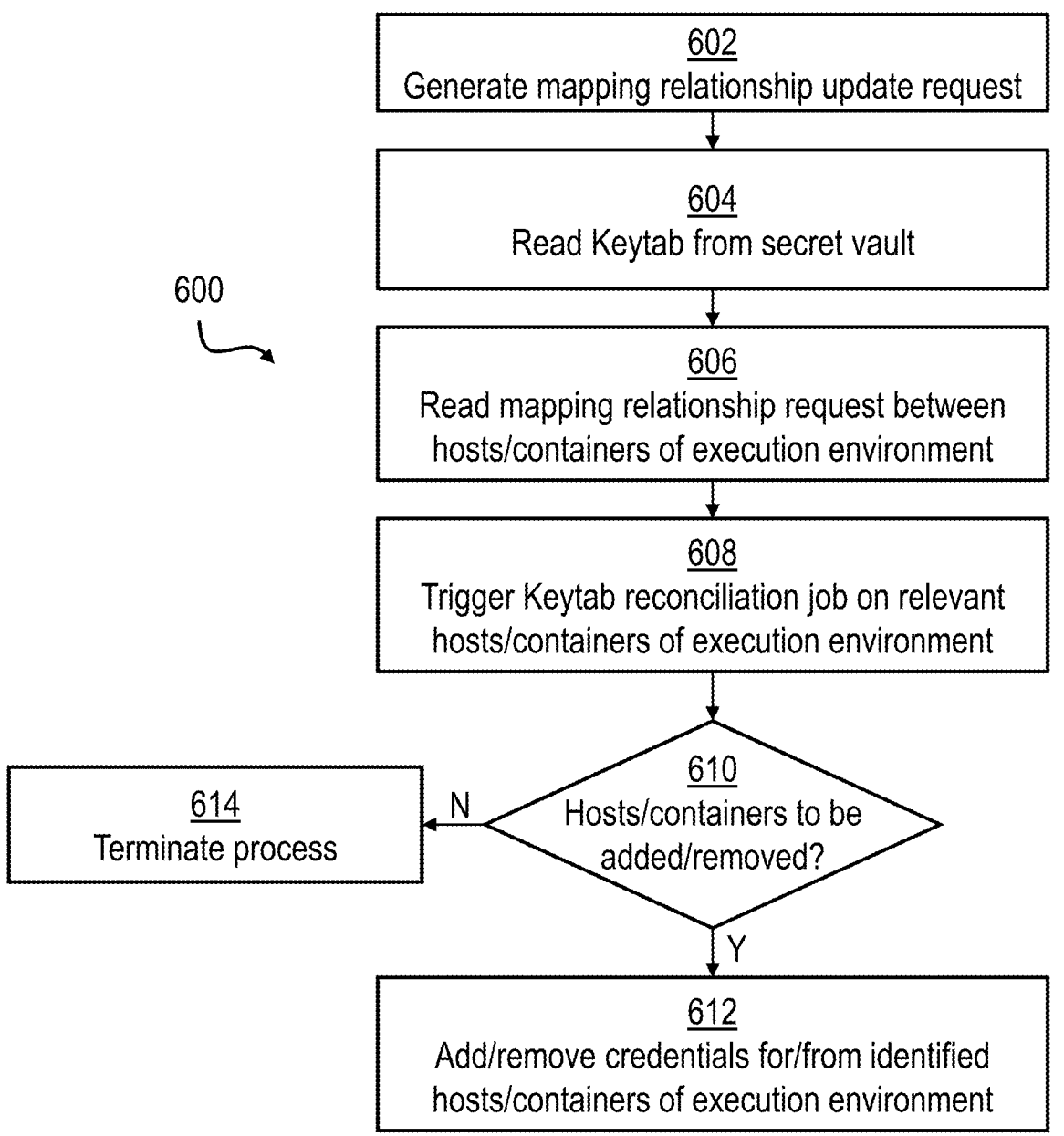
FIG. 6 is an algorithmic flow diagram of a method of mapping a relationship update for NKP authentication using the system of FIG. 1, as configured in FIG. 5, according to one embodiment of the present disclosure.

Referring now to FIG. 6, an algorithmic flow diagram of a method 600 of mapping a relationship update for NKP authentication using the system 100 of FIG. 1, as configured in FIG. 5, is depicted according to one embodiment of the present disclosure. The method 600 can include generating 602 a mapping relationship update request. The request, for example, can be generated by the application owner via the computing device 102 (FIG. 5) an transmitted to the credential distribution tool 108 (FIG. 5). The method 600 can further include reading 604 the credential from the secret vault 106 (FIG. 5), which can be performed by the credential distribution tool 108 (FIG. 5). Thus, the method 600 can include reading 606 the mapping relationship request between all target hosts/containers 110 (FIG. 5) for the service account and triggering 608 a reconciliation job on the relevant hosts/containers 110 (FIG. 5). The method 600 can include determining 610 whether there are hosts/containers to be added or removed for the particular service account. If there are hosts/containers to be added or removed for the service account, the method 600 can include adding/removing 612 credentials for the service account to/from the identified hosts/containers 110 (FIG. 5). For example, the credential distribution tool 108 (FIG. 5) can remove keytab files of the service account from the affected devices.

In various aspects, therefore, the present disclosure is directed to computer-implemented methods and systems for implementing a universal no known password (NKP) security solution for authentication within a networked computing environment of an enterprise. The method, according to various embodiments, can comprise the step of executing, by one or more computing devices in the networked computing environment, an identity management software system, a credential vault software system, and a credential distribution software system, where the software systems are configured to cooperate to implement the method. The method comprises receiving, via the identity management software system, an application programming interface (API) call comprising a request for a new NKP account from a computing device of an owner of an application. The method also comprises, in response to the request for the new NKP account, generating, via the identity management software system, an account on a directory service associated with the application. The method also comprises generating, via the identity management software system, an authentication credential associated with the account. The method also comprises the step of transmitting, via the identity management software system, an API call comprising a write command to the credential vault software system, the write command being associated with the authentication credential and configured to cause the credential vault software system to store the authentication credential in a secure credential vault. The method also comprises the step of transmitting, via the credential distribution software system, an API call comprising a read command to the credential vault software system, the read command being associated with the authentication credential and configured to cause the credential vault software system to provide the authentication credential to the credential distribution software system. And the method also comprises the step of pushing, via the credential distribution software system, the authentication credential to a target execution environment of a plurality of target execution environments in the networked computing environment, wherein the target execution environment corresponds to the authentication credential.

The system according to embodiments of the present invention comprises one or more computing devices configured to execute an identity management software system configured to: receive an application programming interface (API) call comprising a request for a new NKP account from a computing device of an owner of an application; in response to the request for the new NKP account, generate an account on a directory service associated with the application; generate an authentication credential associated with the account; and transmit an API call comprising a write command associated with the authentication credential to a secret vault, wherein the write command is configured to cause the secret vault to store the authentication credential. The system also is configured to execute a credential distribution software system configured to: transmit an API call comprising a read command associated with the authentication credential to the secret vault, wherein the read command is configured to cause the secret vault to provide the authentication credential to the credential distribution software system; and push the authentication credential to a target execution environment of a plurality of hosts and containers that corresponds to the authentication credential.

According to various implementations, the identity management software system, the credential vault software system, and the credential distribution software system are executed on different computers.

According to various implementations, the method further comprises refreshing, via an NKP agent of the target execution environment, a ticket granting ticket (TGT) for the service account based on the authentication credential. In that connection, the method can further comprise joining, via the NKP agent of the target execution environment, a domain associated with the application based on the authentication credential. The TGT can also be refreshed according to a predetermined cadence, such as once every three hours.

According to various implementations, the method further comprises updating, via the identity management software system, the authentication credential according to a predefined cadence configured to avoid credential leakage.

According to various implementations, the method further comprises: receiving, via the identity management software system, an API call comprising a request to rotate the authentication credential from the computing device of the owner of the application; in response to the request to rotate the authentication credential, rotating, via the identity management software system, the authentication credential for the account on the directory service; generating, via the identity management software system, a new authentication credential associated with the account; and transmitting, via the identity management software system, an API call comprising a write command associated with the new authentication credential to a secret vault, wherein the write command is configured to cause the secret vault to store the new authentication credential.

To that end, the method can further comprise: transmitting, via the credential distribution software system, an API call comprising a read command associated with the new authentication credential to the secret vault, wherein the read command is configured to cause the secret vault to provide the new authentication credential to the credential distribution software system; and pushing, via the credential distribution software system, the new authentication credential to the target execution environment of the plurality of hosts and containers that corresponds to the new authentication credential. The method can also comprise refreshing, via an NKP agent of the target execution environment, a ticket granting ticket (TGT) for the service account based on the new authentication credential.

According to various implementations, the method further comprises: receiving, via the credential distribution software system, an API call comprising a request to update mapping relationships from the computing device of the owner of the application; in response to the request to update mapping relationships transmitting, via the credential distribution software system, an API call comprising a read command associated with the request to update mapping relationships to the credential vault software system, wherein the read command is configured to cause the credential vault software system to provide the authentication credential to the credential distribution software system for updating; reading, via the credential distribution software system, a mapping relationship update from the request to update mapping relationships; determining, via the credential distribution software system, that an access of a target execution environment of the plurality of hosts and containers needs to be modified based on the mapping relationship update; and modifying, via the credential distribution software system, the access of the target execution environment of the plurality of hosts and containers based on the determination. To that end, modifying the access of the target execution environment of the plurality of hosts and containers can comprise adding an authentication credential for the target execution environment of the plurality of hosts and containers. Also, modifying the access of the target execution environment of the plurality of hosts and containers can comprise removing an authentication credential for the target execution environment of the plurality of hosts and containers.

In another general aspect, the present invention is directed to a method of implementing a universal no known password (NKP) security solution for authentication. The method can comprise executing, by one or more computing devices in a networked computing environment, an identity management software system, the method comprising: receiving, via an identity management software system, an application programming interface (API) call comprising a request to rotate an authentication credential from a computing device of an owner of an application; in response to the request to rotate the authentication credential, rotating, via the identity management software system, the authentication credential for an account on a directory service associated with the application; generating, via the identity management software system, an authentication credential associated with the account based on the rotation; and transmitting, via the identity management software system, an API call comprising a write command associated with the authentication credential to a secret vault networked computing environment, wherein the write command is configured to cause the secret vault to store the authentication credential.

According to various implementations, the method further comprises transmitting, via a credential distribution software system of the networked computing environment, an API call comprising a read command associated with the authentication credential to the secret vault, wherein the read command is configured to cause the secret vault to provide the authentication credential to the credential distribution software system; and pushing, via the credential distribution software system, the authentication credential to a target execution environment of a plurality of hosts and containers that corresponds to the authentication credential.

According to various implementations, the method can further comprise refreshing, via an NKP agent of the target execution environment of the plurality of hosts and containers, a ticket granting ticket (TGT) for the account based on the authentication credential.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various aspects have been described herein, it should be apparent that various modifications, alterations, and adaptations to those aspects may occur to persons skilled in the art with attainment of at least some of the advantages. The disclosed aspects are therefore intended to include all such modifications, alterations, and adaptations without departing from the scope of the aspects as set forth herein.

What is claimed is:

1. A computer-implemented method of implementing a universal no known password (NKP) security solution for authentication within a networked computing environment of an enterprise, the computer-implemented method comprising executing, by one or more computing devices in the networked computing environment, an identity management software system, a credential vault software system, and a credential distribution software system, wherein the software systems are configured to cooperate to implement the computer-implemented method, the computer-implemented method comprising:

receiving, via the identity management software system, an application programming interface (API) call comprising a request for a new NKP account from a computing device of an owner of an application;

in response to the request for the new NKP account, generating, via the identity management software system, an account on a directory service associated with the application;

generating, via the identity management software system, an authentication credential associated with the account;

transmitting, via the identity management software system, an API call comprising a write command to the credential vault software system, the write command being associated with the authentication credential and configured to cause the credential vault software system to store the authentication credential in a secure credential vault;

transmitting, via the credential distribution software system, an API call comprising a read command to the credential vault software system, the read command being associated with the authentication credential and configured to cause the credential vault software system to provide the authentication credential to the credential distribution software system; and pushing, via the credential distribution software system, the authentication credential to a target execution environment of a plurality of target execution environments in the networked computing environment, wherein the target execution environment corresponds to the authentication credential.

2. The computer-implemented method of claim 1, wherein the identity management software system, the credential vault software system, and the credential distribution software system are executed on different computers.

3. The computer-implemented method of claim 1, further comprising:

refreshing, via an NKP agent of the target execution environment, a ticket granting ticket (TGT) for the account based on the authentication credential.

4. The computer-implemented method of claim 3, further comprising:

joining, via the NKP agent of the target execution environment, a domain associated with the application based on the authentication credential.

5. The computer-implemented method of claim 3, wherein the TGT is refreshed according to a predetermined cadence.

6. The computer-implemented method of claim 5, wherein the predetermined cadence is once every three hours.

7. The computer-implemented method of claim 1, further comprising:

updating, via the identity management software system, the authentication credential according to a predefined cadence configured to avoid credential leakage.

8. The computer-implemented method of claim 1, further comprising:

receiving, via the identity management software system, an API call comprising a request to rotate the authentication credential from the computing device of the owner of the application;

in response to the request to rotate the authentication credential, rotating, via the identity management software system, the authentication credential for the account on the directory service;

generating, via the identity management software system, a new authentication credential associated with the account; and transmitting, via the identity management software system, an API call comprising a write command associated with the new authentication credential to a secret vault, wherein the write command is configured to cause the secret vault to store the new authentication credential.

9. The computer-implemented method of claim 8, further comprising:

transmitting, via the credential distribution software system, an API call comprising a read command associated with the new authentication credential to the secret vault, wherein the read command is configured to cause the secret vault to provide the new authentication credential to the credential distribution software system; and pushing, via the credential distribution software system, the new authentication credential to the target execution environment of a plurality of hosts and containers that corresponds to the new authentication credential.

10. The computer-implemented method of claim 8, further comprising:

refreshing, via an NKP agent of the target execution environment, a ticket granting ticket (TGT) for the account based on the new authentication credential.

11. The computer-implemented method of claim 9, further comprising:

receiving, via the credential distribution software system, an API call comprising a request to update mapping relationships from the computing device of the owner of the application;

in response to the request to update the mapping relationships transmitting, via the credential distribution software system, an API call comprising a read command associated with the request to update the mapping relationships to the credential vault software system, wherein the read command is configured to cause the credential vault software system to provide the authentication credential to the credential distribution software system for updating;

reading, via the credential distribution software system, a mapping relationship update from the request to update the mapping relationships;

determining, via the credential distribution software system, that an access of the target execution environment of the plurality of hosts and containers needs to be modified based on the mapping relationship update; and modifying, via the credential distribution software system, the access of the target execution environment of the plurality of hosts and containers based on the determination.

12. The computer-implemented method of claim 11, wherein modifying the access of the target execution environment of the plurality of hosts and containers comprises adding an authentication credential for the target execution environment of the plurality of hosts and containers.

13. The computer-implemented method of claim 11, wherein modifying the access of the target execution environment of the plurality of hosts and containers comprises removing an authentication credential for the target execution environment of the plurality of hosts and containers.

14. A method of implementing a universal no known password (NKP) security solution for authentication, the method comprising executing, by one or more computing devices in a networked computing environment, an identity management software system, the method comprising:

receiving, via the identity management software system, an application programming interface (API) call comprising a request to rotate an authentication credential from a computing device of an owner of an application;

in response to the request to rotate the authentication credential, rotating, via the identity management software system, the authentication credential for an account on a directory service associated with the application;

generating, via the identity management software system, the authentication credential associated with the account based on the rotation;

transmitting, via the identity management software system, an API call comprising a write command associated with the authentication credential to a secret vault, wherein the write command is configured to cause the secret vault to store the authentication credential;

transmitting, via a credential distribution software system of the networked computing environment, an API call comprising a read command associated with the authentication credential to the secret vault, wherein the read command is configured to cause the secret vault to provide the authentication credential to the credential distribution software system;

pushing, via the credential distribution software system, the authentication credential to a target execution environment of a plurality of hosts and containers that corresponds to the authentication credential; and refreshing, via an NKP agent of the target execution environment of the plurality of hosts and containers, a ticket granting ticket (TGT) for the account based on the authentication credential.

15. A system configured to implement a universal no known password (NKP) security solution for authentication, the system comprising one or more computing devices configured to execute:

an identity management software system configured to:

receive an application programming interface (API) call comprising a request for a new NKP account from a computing device of an owner of an application;

in response to the request for the new NKP account, generate an account on a directory service associated with the application;

generate an authentication credential associated with the account; and transmit an API call comprising a write command associated with the authentication credential to a secret vault, wherein the write command is configured to cause the secret vault to store the authentication credential; and a credential distribution software system configured to:

transmit an API call comprising a read command associated with the authentication credential to the secret vault, wherein the read command is configured to cause the secret vault to provide the authentication credential to the credential distribution software system; and push the authentication credential to a target execution environment of a plurality of hosts and containers that corresponds to the authentication credential.

16. The system of claim 15, wherein the identity management software system is further configured to:

update the authentication credential according to a predefined cadence configured to avoid credential leakage.

17. The system of claim 15, wherein the identity management software system is further configured to:

receive an API call comprising a request to rotate the authentication credential from the computing device of the owner of the application;

in response to the request to rotate the authentication credential, rotate the authentication credential for the account on the directory service;

generate a new authentication credential associated with the account; and transmit an API call comprising a write command associated with the new authentication credential to the secret vault, wherein the write command is configured to cause the secret vault to store the new authentication credential.

18. The system of claim 17, wherein the credential distribution software system is further configured to:

transmit an API call comprising a read command associated with the new authentication credential to the secret vault, wherein the read command is configured to cause the secret vault to provide the new authentication credential to the credential distribution software system; and push the new authentication credential to the target execution environment of the plurality of hosts and containers that corresponds to the new authentication credential.

19. The system of claim 17, further comprising:

the target execution environment configured to execute an NKP agent, wherein the NKP agent is configured to refresh a ticket granting ticket (TGT) for the account based on the new authentication credential.

* * * * *